United States Patent
Kulkarni et al.

(10) Patent No.: US 9,850,794 B2
(45) Date of Patent: Dec. 26, 2017

(54) POWER GENERATION SYSTEM EXHAUST COOLING

(71) Applicant: General Electric Company, Schenectady, NY (US)

(72) Inventors: Parag Prakash Kulkarni, Niskayuna, NY (US); Lewis Berkley Davis, Jr., Niskayuna, NY (US); Robert Joseph Reed, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 403 days.

(21) Appl. No.: 14/753,085

(22) Filed: Jun. 29, 2015

(65) Prior Publication Data
US 2016/0376957 A1 Dec. 29, 2016

(51) Int. Cl.
*F02C 7/08* (2006.01)
*F01N 3/05* (2006.01)
(Continued)

(52) U.S. Cl.
CPC ............ *F01N 3/05* (2013.01); *F01D 25/305* (2013.01); *F01N 3/2066* (2013.01); *F02C 3/10* (2013.01);
(Continued)

(58) Field of Classification Search
CPC .. F01N 3/05; F01N 3/2066; F02C 3/04; F02C 6/08; F02C 6/18; F05D 2220/32;
(Continued)

(56) References Cited

U.S. PATENT DOCUMENTS 3,968,647 A * 7/1976 Boudigues ............... F02K 3/04
415/77
3,998,047 A 12/1976 Walker
(Continued)

FOREIGN PATENT DOCUMENTS

CH 679236 A5 1/1992
EP 1 643 113 A2 4/2006
(Continued)

OTHER PUBLICATIONS

Chupka, Marc; "Independent Evaluation of SCR Systems for Frame-Type Combustion Turbines"; The Brattle Group; Anthony Licata, Licata Energy & Environmental Consulting, Inc.; Report for ICAP Demand Curve Reset; Prepared for New York Independent System Operator, Inc.; Nov. 1, 2013; 42 Pages.
(Continued)

*Primary Examiner* — Jesse Bogue
(74) *Attorney, Agent, or Firm* — Ernest G. Cusick; Hoffman Warnick LLC

(57) ABSTRACT

A power generation system according to an embodiment includes: a gas turbine system including a compressor component, a combustor component, and a turbine component; an airflow generation system coupled to an expander shaft downstream of the gas turbine system for drawing in a flow of ambient air through an air intake section; a mixing area for receiving an exhaust gas stream produced by the gas turbine system;
a flow directing system for directing the flow of ambient air generated by the airflow generation system to the mixing area to reduce a temperature of the exhaust gas stream; and an exhaust processing system for processing the reduced temperature exhaust gas stream.

15 Claims, 5 Drawing Sheets

(51) Int. Cl.
*F01D 25/30* (2006.01)
*F01N 3/20* (2006.01)
*F02C 3/10* (2006.01)

(52) U.S. Cl.
CPC ...... *F01N 2270/02* (2013.01); *F05D 2220/36* (2013.01); *Y02E 20/14* (2013.01)

(58) Field of Classification Search
CPC ........... F05D 2220/72; F05D 2260/606; Y02E 20/14; Y02E 20/16
See application file for complete search history.

(56) References Cited

U.S. PATENT DOCUMENTS

| | | | |
|---|---|---|---|
| 4,069,661 A * | 1/1978 | Rundell | F02K 3/075 60/204 |
| 4,131,432 A | 12/1978 | Sato et al. | |
| 4,165,609 A | 8/1979 | Rudolph | |
| 4,183,210 A * | 1/1980 | Snell | F02K 3/062 60/204 |
| 4,292,008 A | 9/1981 | Grosjean et al. | |
| 4,875,436 A | 10/1989 | Smith et al. | |
| 4,961,312 A | 10/1990 | Simmons | |
| 4,982,564 A | 1/1991 | Hines | |
| 5,014,508 A | 5/1991 | Lifka | |
| 5,255,505 A | 10/1993 | Cloyd et al. | |
| 5,473,898 A | 12/1995 | Briesch | |
| 6,161,768 A | 12/2000 | Gordon et al. | |
| 6,250,061 B1 | 6/2001 | Orlando | |
| 6,612,114 B1 | 9/2003 | Klingels | |
| 6,786,034 B2 * | 9/2004 | Liebig | F01K 23/10 60/39.41 |
| 7,493,769 B2 | 2/2009 | Jangili | |
| 7,622,094 B2 | 11/2009 | Lewis et al. | |
| 7,966,825 B2 | 6/2011 | Judd | |
| 8,015,826 B2 | 9/2011 | Myers et al. | |
| 8,186,152 B2 | 5/2012 | Zhang et al. | |
| 8,261,528 B2 * | 9/2012 | Chillar | F02C 1/08 244/134 R |
| 8,549,833 B2 | 10/2013 | Hyde et al. | |
| 2002/0124568 A1 | 9/2002 | Mikkelsen et al. | |
| 2003/0182944 A1 | 10/2003 | Hoffman et al. | |
| 2005/0150229 A1 | 7/2005 | Baer et al. | |
| 2005/0235649 A1 | 10/2005 | Baer et al. | |
| 2007/0101696 A1 | 5/2007 | Dooley | |
| 2007/0130952 A1 | 6/2007 | Copen | |
| 2008/0116054 A1 | 5/2008 | Leach et al. | |
| 2008/0253881 A1 * | 10/2008 | Richards | F02C 7/052 415/145 |
| 2010/0024379 A1 | 2/2010 | Sengar et al. | |
| 2010/0064655 A1 | 3/2010 | Zhang et al. | |
| 2010/0107600 A1 * | 5/2010 | Hillel | F01D 17/08 60/235 |
| 2010/0215558 A1 | 8/2010 | Kraemer | |
| 2011/0030331 A1 | 2/2011 | Tong et al. | |
| 2011/0036066 A1 | 2/2011 | Zhang et al. | |
| 2011/0067385 A1 | 3/2011 | Hirata et al. | |
| 2011/0138771 A1 | 6/2011 | Feller et al. | |
| 2011/0158876 A1 | 6/2011 | Buzanowski et al. | |
| 2012/0171020 A1 | 7/2012 | Peck et al. | |
| 2013/0005237 A1 | 1/2013 | Baten et al. | |
| 2013/0031894 A1 | 2/2013 | Hodgson et al. | |
| 2013/0031910 A1 | 2/2013 | Merchant et al. | |
| 2013/0125557 A1 | 5/2013 | Scipio et al. | |
| 2013/0318941 A1 | 12/2013 | Ekanayake et al. | |
| 2013/0318965 A1 | 12/2013 | Ekanayake et al. | |
| 2013/0318984 A1 | 12/2013 | Ekanayake et al. | |
| 2013/0318987 A1 | 12/2013 | Ekanayake et al. | |
| 2013/0318997 A1 | 12/2013 | Conchieri et al. | |
| 2014/0090354 A1 | 4/2014 | Scipio et al. | |
| 2014/0150447 A1 | 6/2014 | Ekanayake et al. | |
| 2014/0208765 A1 | 7/2014 | Ekanayake et al. | |
| 2014/0230433 A1 | 8/2014 | Yacoub | |
| 2014/0230444 A1 | 8/2014 | Hao et al. | |
| 2014/0234073 A1 | 8/2014 | Moreton et al. | |
| 2015/0047359 A1 | 2/2015 | Maguire et al. | |
| 2015/0089955 A1 | 4/2015 | Knapp et al. | |
| 2015/0143811 A1 | 5/2015 | Pang et al. | |
| 2015/0252683 A1 | 9/2015 | Hasting et al. | |
| 2016/0169119 A1 | 6/2016 | Musci et al. | |
| 2016/0201605 A1 | 7/2016 | Brandstein et al. | |
| 2016/0348560 A1 | 12/2016 | Sato et al. | |
| 2016/0376959 A1 | 12/2016 | Davis, Jr. et al. | |

FOREIGN PATENT DOCUMENTS

| | | |
|---|---|---|
| EP | 2 223 733 A1 | 9/2010 |
| EP | 2 615 265 A2 | 7/2013 |
| EP | 3 070 301 A1 | 9/2016 |
| GB | 774425 A | 5/1957 |
| JP | 2013124555 A | 6/2013 |
| WO | 2012/092215 A1 | 7/2012 |

OTHER PUBLICATIONS

Licata A., et al., "Viability of SCR on Simple Cycle Frame Gas Turbines," Licata Energy & Environmental Consultants, Inc., Yonkers, NY, Power Gen. 2014, Dec. 9-11, 2014, pp. 1-13.

"Turbofan," From Wikipedia, the free encyclopedia, Retrieved from the Internet URL: http://en.wikipedia.org/wiki/Turbofan, on Jan. 3, 2017, pp. 1-21.

Extended European Search Report and Opinion issued in connection with related EP Application No. 16176400.6 dated Nov. 14, 2016.

Extended European Search Report and Opinion issued in connection with related EP Application No. 16176128.3 dated Nov. 15, 2016.

Extended European Search Report and Opinion issued in connection with corresponding EP Application No. 16175821.4 dated Nov. 16, 2016.

Extended European Search Report and Opinion issued in connection with related EP Application No. 16175335.5 dated Nov. 25, 2016.

Extended European Search Report and Opinion issued in connection with related EP Application No. 16176515.1 dated Nov. 28, 2016.

Extended European Search Report and Opinion issued in connection with related EP Application No. 16176652.2 dated Nov. 28, 2016.

Extended European Search Report and Opinion issued in connection with related EP Application No. 16175556.6 dated Nov. 28, 2016.

Extended European Search Report and Opinion issued in connection with related EP Application No. 16176514.4 dated Dec. 2, 2016.

Non-Final Rejection towards related U.S. Appl. No. 14/753,073, dated Dec. 13, 2016.

U.S. Appl. No. 14/753,088, filed Jun. 29, 2015, Reed et al.
U.S. Appl. No. 14/753,064, filed Jun. 29, 2015, Davis et al.
U.S. Appl. No. 14/753,066, filed Jun. 29, 2015, Davis et al.
U.S. Appl. No. 14/753,072, filed Jun. 29, 2015, Davis et al.
U.S. Appl. No. 14/753,073, filed Jun. 29, 2015, Kulkarni et al.
U.S. Appl. No. 14/753,074, filed Jun. 29, 2015, Kulkarni et al.
U.S. Appl. No. 14/753,077, filed Jun. 29, 2015, Reed et al.
U.S. Appl. No. 14/753,080, filed Jun. 29, 2015, Kulkarni et al.
U.S. Appl. No. 14/753,093, filed Jun. 29, 2015, Kulkarni et al.
U.S. Appl. No. 14/753,102, filed Jun. 29, 2015, Davis et al.
U.S. Appl. No. 14/753,107, filed Jun. 29, 2015, Kulkarni et al.
U.S. Appl. No. 14/753,097, filed Jun. 29, 2015, Davis et al.
U.S. Appl. No. 14/753,105, filed Jun. 29, 2015, Reed et al.
U.S. Appl. No. 14/753,073, Office Action 1 dated Dec. 13, 2016, 16 pages.
U.S. Appl. No. 14/753,064, Office Action 1 dated Jan. 19, 2017, 24 pages.
U.S. Appl. No. 14/753,066, Office Action 1 dated Feb. 24, 2017, 33 pages.

(56) References Cited

OTHER PUBLICATIONS

U.S. Appl. No. 14/753,072, Office Action 1 dated Feb. 24, 2017, 34 pages.
Michael J. Reale, "New High Efficiency Simple Cycle Gas Turbine," General Electric Company, 2004, 20 pages. http://site.ge-energy.com/prod_serv/products/tech_docs/en/downloads/ger4222a.pdf.
U.S. Appl. No. 14/753,093, Office Action 1 dated Jun. 1, 2017, 40 pages.
U.S. Appl. No. 14/753,064, Final Office Action 1 dated Jun. 2, 2017, 31 pages.
U.S. Appl. No. 14/753,073, Final Office Action 1 dated Jun. 20, 2017, 28 pages.
U.S. Appl. No. 14/753,088, Office Action 1 dated Jun. 28, 2017, 37 pages.
U.S. Appl. No. 14/753,066, Notice of Allowance dated Jul. 13, 2017, 27 pages.
U.S. Appl. No. 14/753,072, Notice of Allowance dated Jul. 13, 2017, 28 pages.
U.S. Appl. No. 14/753,074, Notice of Allowance dated Sep. 18, 2017, 31 pages.
U.S. Appl. No. 14/753,064, Notice of Allowance dated Sep. 21, 2017, 10 pages.
U.S. Appl. No. 14/753,074, Office Action 1 dated Mar. 10, 2017, 41 pages.
U.S. Appl. No. 14/753,107, Office Action 1 dated Oct. 20, 2017, 52 pages.
U.S. Appl. No. 14/753,088, Final Office Action 1 dated Oct. 19, 2017, 32 pages.
U.S. Appl. No. 14/753,102, Office Action 1 dated Oct. 26, 2017, 53 pages.
U.S. Appl. No. 14/753,093, Final Office Action 1 dated Nov. 1, 2017, 30 pages.
U.S. Appl. No. 14/753,080, Notice of Allowance date Nov. 3, 2017, 18 pages.
U.S. Appl. No. 14/753,097, Office Action 1 dated Oct. 11, 2017, 53 pages.
U.S. Appl. No. 14/753,077, Office Action 1 dated Oct. 13, 2017, 54 pages.

* cited by examiner

POWER GENERATION SYSTEM EXHAUST COOLING

CROSS-REFERENCE TO RELATED APPLICATIONS

This application is related to co-pending US application numbers: application Ser. No. 14/753,064, application Ser. No. 14/753,066, application Ser. No. 14/753,072, application Ser. No. 14/753,073, application Ser. No. 14/753,074, application Ser. No. 14/753,077, application Ser. No. 14/753,080, application Ser. No. 14/753,088, application Ser. No. 14/753,093, application Ser. No. 14/753,102, application Ser. No. 14/753,107, application Ser. No. 14/753,097, and application Ser. No. 14/753,105, all filed on Jun. 29, 2015.

BACKGROUND OF THE INVENTION

The disclosure relates generally to power generation systems, and more particularly, to systems and methods for cooling the exhaust gas of power generation systems.

Exhaust gas from power generation systems, for example a simple cycle gas turbine power generation system, often must meet stringent regulatory requirements for the composition of the exhaust gas released into the atmosphere. One of the components typically found in the exhaust gas of a gas turbine power generation system and subject to regulation is nitrogen oxide (i.e., $NO_x$), which includes, for example, nitric oxide and nitrogen dioxide. To remove the $NO_x$ from the exhaust gas stream, technology such as selective catalytic reduction (SCR) is often utilized. In an SCR process, ammonia ($NH_3$) or the like reacts with the $NO_x$ and produces nitrogen ($N_2$) and water ($H_2O$).

The effectiveness of the SCR process depends in part on the temperature of the exhaust gas that is processed. The temperature of the exhaust gas from a gas turbine power generation system is often higher than about 1100° F. However, SCR catalysts need to operate at less than about 900° F. to maintain effectiveness over a reasonable catalyst lifespan. To this extent, the exhaust gas from a simple cycle gas turbine power generation system is typically cooled prior to SCR.

Large external blower systems have been used to reduce the exhaust gas temperature of a gas turbine power generation system below 900° F. by mixing a cooling gas, such as ambient air, with the exhaust gas. Because of the possibility of catalyst damage due to a failure of an external blower system, a redundant external blower system is typically utilized. These external blower systems include many components, such as blowers, motors, filters, air intake structures, and large ducts, which are expensive, bulky, and add to the operating cost of a gas turbine power generation system. Additionally the external blower systems and the operation of the gas turbine power generation system are not inherently coupled, thus increasing the probability of SCR catalyst damage due to excess temperature during various modes of gas turbine operation. To prevent SCR catalyst damage due to excess temperature (e.g., if the external blower system(s) fail or cannot sufficiently cool the exhaust gas), the gas turbine may need to be shut down until the temperature issue can be rectified.

Utility power producers may use a combined cycle (CC) power generation system because of its inherent high efficiencies and installed cost advantage. CC power generation systems typically include a gas turbine, a heat recovery steam generator (HRSG), and a steam turbine. The heat recovery steam generator uses the hot exhaust gas from the gas turbine to create steam, which drives the steam turbine. The combination of a gas turbine and a steam turbine achieves greater efficiency than would be possible independently.

Operational flexibility to meet varying power grid demands at different times of the day is an important consideration in CC power generation systems. The issue becomes more important as intermittent energy sources such as solar and wind are integrated into the power grid. To this extent, CC power generation systems powered by fossil fuels must be capable of increasing/decreasing power output as required to accommodate such intermittent energy sources.

Non-steady state emissions from a CC power generation system (e.g., during start-up) are generally closely scrutinized by regulatory authorities. During start-up, emission control devices employing selective catalytic reduction (SCR) and carbon monoxide (CO) catalysts are not active. To avoid thermal stresses in the steam turbine, the gas turbine has to be held at a lower load to control the HRSG inlet temperature to around 700° F. Since emissions are higher at lower gas turbine loads and the emission control devices are not yet active, emissions during start-up can be an order of magnitude higher than those at steady state operation. Further, operating gas turbines at lower loads for a considerable amount of time also reduces the power provided to the power grid during the crucial start-up period.

BRIEF DESCRIPTION OF THE INVENTION

A first aspect of the disclosure provides an airflow control system for a gas turbine system, including: an airflow generation system for attachment to a rotatable expander shaft of a gas turbine system, downstream of the gas turbine system, for drawing in a flow of ambient air through an air intake section; a mixing area for receiving an exhaust gas stream produced by the gas turbine system; and a flow directing system for directing the flow of ambient air drawn in by the airflow generation system to the mixing area to reduce a temperature of the exhaust gas stream.

A second aspect of the disclosure provides a turbomachine system, including: a gas turbine system including a compressor component, a combustor component, and a turbine component; a fan coupled to an expander shaft of the gas turbine system, downstream of the gas turbine system, for drawing in a flow of ambient air through an air intake section, wherein the fan comprises an inner radial stage for passing the exhaust gas stream produced by the gas turbine system to the mixing area, and an outer radial stage for drawing in the flow of ambient air through the air intake section; a mixing area for receiving an exhaust gas stream produced by the gas turbine system; and a flow directing system for directing the flow of ambient air drawn in by the airflow generation system to the mixing area to reduce a temperature of the exhaust gas stream.

A third aspect of the disclosure provides a power generation system, comprising: a gas turbine system including a compressor component, a combustor component, and a turbine component; a shaft driven by the turbine component; an electrical generator coupled to the shaft for generating electricity; a fan coupled to an expander shaft of the gas turbine system, downstream of the gas turbine system, for drawing in a flow of ambient air through an air intake section, wherein the fan comprises an inner radial stage for passing the exhaust gas stream produced by the gas turbine system to the mixing area, and an outer radial stage for drawing in the flow of ambient air through the air intake section; a mixing area for receiving an exhaust gas stream produced by the gas turbine system; and a flow directing system for directing the flow of ambient air drawn in by the airflow generation system to the mixing area to reduce a temperature of the exhaust gas stream.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawing that depicts various embodiments of the disclosure.

It is noted that the drawing of the disclosure is not to scale. The drawing is intended to depict only typical aspects of the disclosure, and therefore should not be considered as limiting the scope of the disclosure. In the drawing, like numbering represents like elements between the drawings.

DETAILED DESCRIPTION OF THE INVENTION

As indicated above, the disclosure relates generally to power generation systems, and more particularly, to systems and methods for cooling the exhaust gas of power generation systems.

Figure 1:
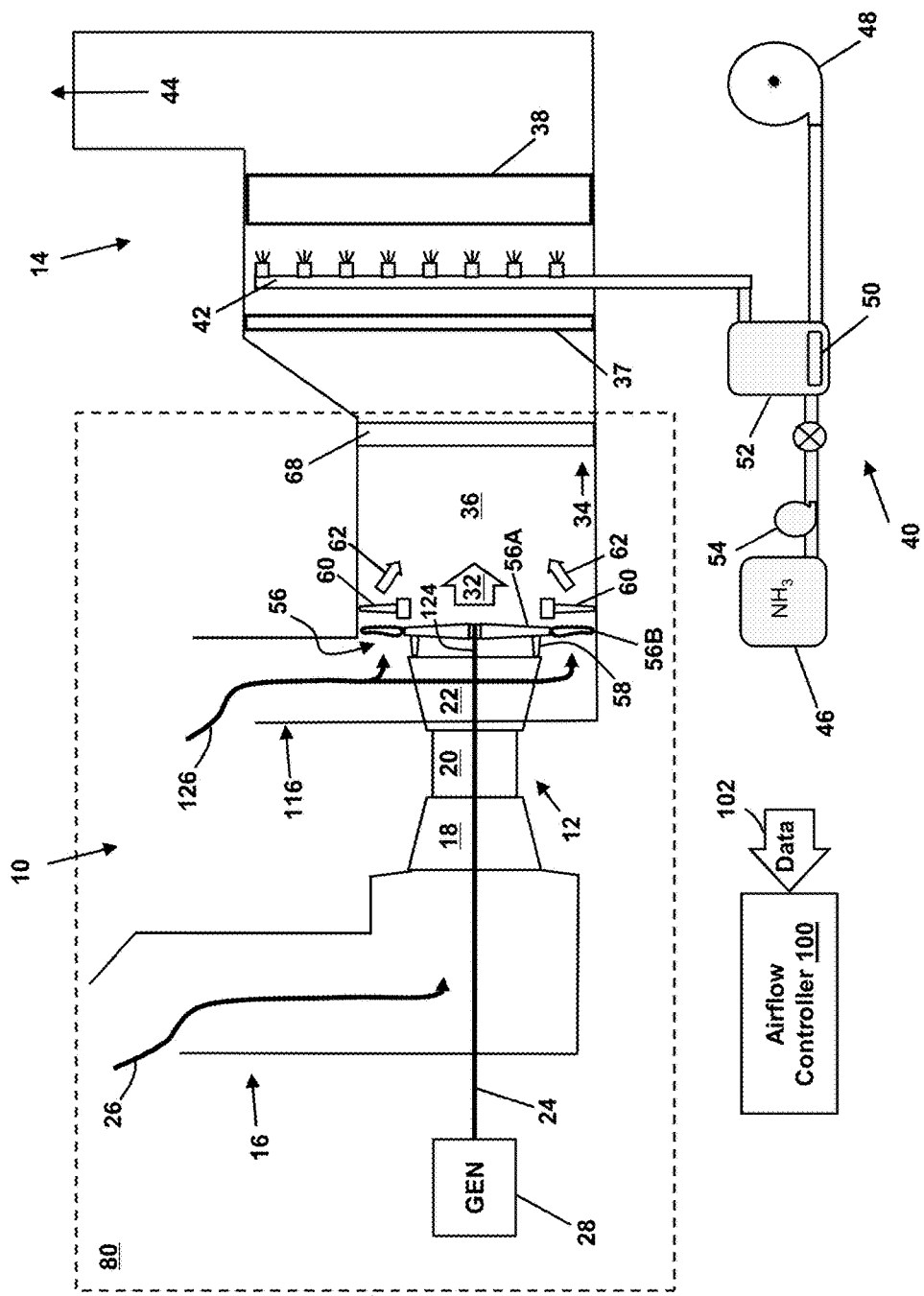
FIG. 1 shows a schematic diagram of a simple cycle gas turbine power generation system according to embodiments.

FIG. 1 is a block diagram of a turbomachine system (e.g., a simple cycle gas turbine power generation system 10) that includes a gas turbine system 12 and an exhaust processing system 14. The gas turbine system 12 may combust liquid or gas fuel, such as natural gas and/or a hydrogen-rich synthetic gas, to generate hot combustion gases to drive the gas turbine system 12.

The gas turbine system 12 includes an air intake section 16, a compressor component 18, a combustor component 20, and a turbine component 22. The turbine component 22 is drivingly coupled to the compressor component 18 via a shaft 24. In operation, air (e.g., ambient air) enters the gas turbine system 12 through the air intake section 16 (indicated by arrow 26) and is pressurized in the compressor component 18. The compressor component 18 includes at least one stage including a plurality of compressor blades coupled to the shaft 24. Rotation of the shaft 24 causes a corresponding rotation of the compressor blades, thereby drawing air into the compressor component 18 via the air intake section 16 and compressing the air prior to entry into the combustor component 20.

The combustor component 20 may include one or more combustors. In embodiments, a plurality of combustors are disposed in the combustor component 20 at multiple circumferential positions in a generally circular or annular configuration about the shaft 24. As compressed air exits the compressor component 18 and enters the combustor component 20, the compressed air is mixed with fuel for combustion within the combustor(s). For example, the combustor(s) may include one or more fuel nozzles that are configured to inject a fuel-air mixture into the combustor(s) in a suitable ratio for combustion, emissions control, fuel consumption, power output, and so forth. Combustion of the fuel-air mixture generates hot pressurized exhaust gases, which may then be utilized to drive one or more turbine stages (each having a plurality of turbine blades) within the turbine component 22.

In operation, the combustion gases flowing into and through the turbine component 22 flow against and between the turbine blades, thereby driving the turbine blades and, thus, the shaft 24 into rotation. In the turbine component 22, the energy of the combustion gases is converted into work, some of which is used to drive the compressor component 18 through the rotating shaft 24, with the remainder available for useful work to drive a load such as, but not limited to, an electrical generator 28 for producing electricity, and/or another turbine. An expander shaft 124 may be coupled to the shaft 24 (or may comprise an extended portion of the shaft 24). The expander shaft 124 extends in a downstream direction 34 beyond the downstream end 30 of the turbine component 22. The expander shaft 124 may rotate at the same rotational speed as the shaft 24, or may be configured (e.g., with appropriate gearing) to rotate at a different rotational speed than the shaft 24.

The combustion gases that flow through the turbine component 22 exit the downstream end 30 of the turbine component 22 as a stream of exhaust gas 32. The exhaust gas stream 32 may continue to flow in the downstream direction 34 towards the exhaust processing system 14. The downstream end 30 of the turbine component 22 may be fluidly coupled via a mixing area 36 to a CO removal system (including, e.g., a CO catalyst 37) and an SCR system (including, e.g., an SCR catalyst 38) of the exhaust processing system 14. As discussed above, as a result of the combustion process, the exhaust gas stream 32 may include certain byproducts, such as nitrogen oxides ($NO_x$), sulfur oxides ($SO_x$), carbon oxides ($CO_x$), and unburned hydrocarbons. Due to certain regulatory requirements, an exhaust processing system 14 may be employed to reduce or substantially minimize the concentration of such byproducts prior to atmospheric release.

One technique for removing or reducing the amount of $NO_x$ in the exhaust gas stream 32 is by using a selective catalytic reduction (SCR) process. For example, in an SCR process for removing $NO_x$ from the exhaust gas stream 32, ammonia ($NH_3$) or other suitable reductant may be injected into the exhaust gas stream 32. The ammonia reacts with the $NO_x$ to produce nitrogen ($N_2$) and water ($H_2O$).

As shown in FIG. 1, an ammonia evaporator system 40 and an ammonia injection grid 42 may be used to vaporize and inject an ammonia solution (e.g., stored in a tank 46) into the exhaust gas stream 32 upstream of the SCR catalyst 38. The ammonia injection grid 42 may include, for example, a network of pipes with openings/nozzles for injecting vaporized ammonia into the exhaust gas stream 32. As will be appreciated, the ammonia and $NO_x$ in the exhaust gas stream 32 react as they pass through the SCR catalyst 38 to produce nitrogen ($N_2$) and water ($H_2O$), thus removing $NO_x$ from the exhaust gas stream 32. The resulting emissions may be released into the atmosphere through a stack 44 of the gas turbine system 12.

The ammonia evaporator system 40 may further include, for example, a blower system 48, one or more heaters 50 (e.g., electric heaters), and an ammonia vaporizer 52, for providing vaporized ammonia that is injected into the exhaust gas stream 32 via the ammonia injection grid 42. The ammonia may be pumped from the tank 46 to the ammonia vaporizer 52 using a pump system 54. The blower system 48 may include redundant blowers, while the pump system 54 may include redundant pumps to ensure continued operation of the ammonia evaporator system 40 in case of individual blower/pump failure.

The effectiveness of the SCR process depends in part on the temperature of the exhaust gas stream 32 that is processed. The temperature of the exhaust gas stream 32 generated by the gas turbine system 12 is often higher than about 1100° F. However, the SCR catalyst 38 typically needs to operate at temperatures less than about 900° F.

According to embodiments, an airflow generation system comprising, for example, a fan 56, may be provided. As depicted in FIG. 1, the fan 56 may be coupled to the expander shaft 124 downstream of the turbine component 22 of the gas turbine system 12. The fan 56 is configured to provide cooling air (e.g., ambient air) drawn in through an air intake section 116 (indicated by arrows 126) that may be used to lower the temperature of the exhaust gas stream 32 to a level suitable for use with the SCR catalyst 38. The fan 56 may be fixedly mounted (e.g. bolted, welded, etc.) to the expander shaft 124 of the gas turbine system 12. To this extent, the fan 56 is configured to rotate at the same rotational speed as the expander shaft 124.

Figure 2:
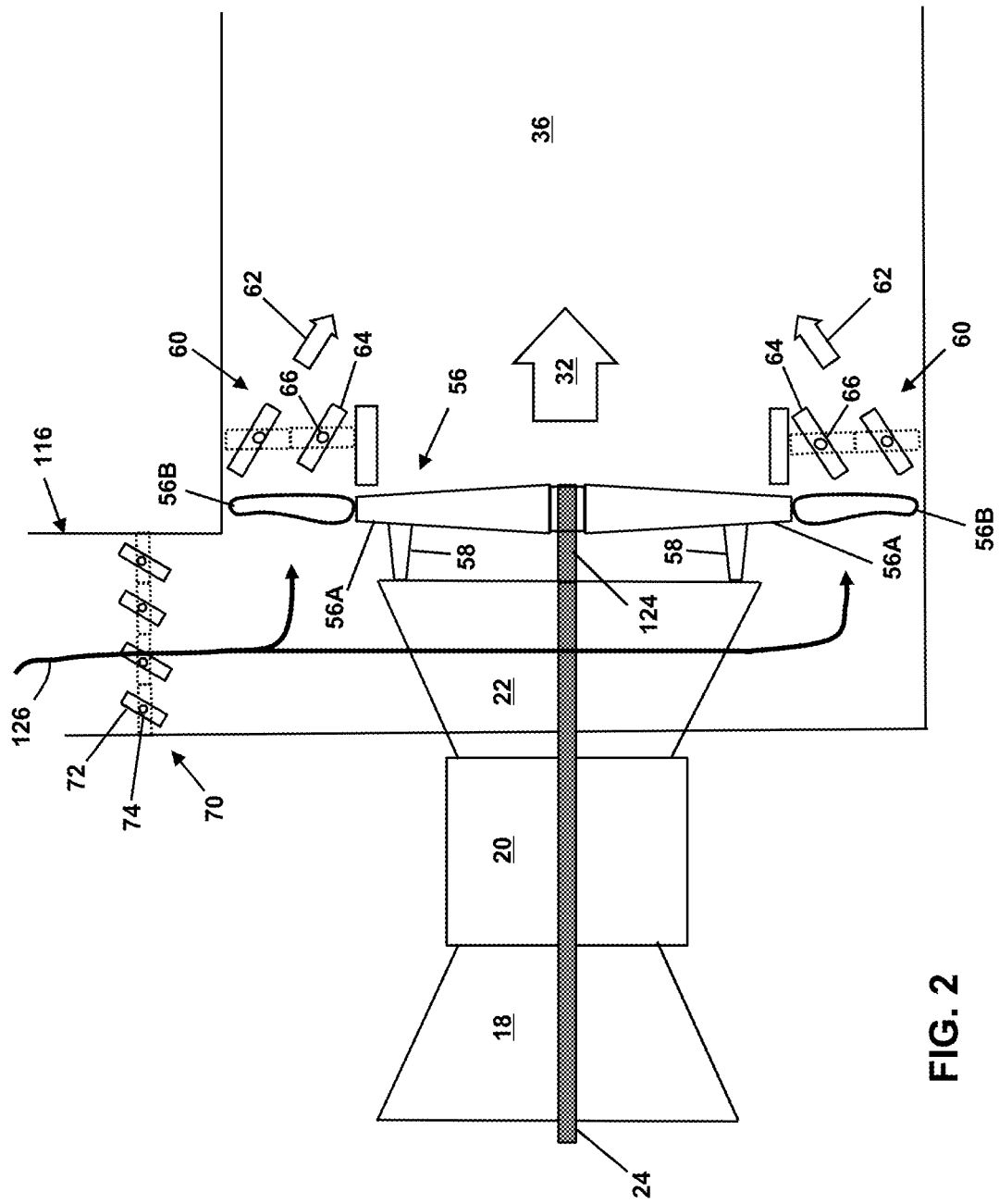
FIG. 2 depicts an enlarged view of a portion of the simple cycle gas turbine power generation system of FIG. 1 according to embodiments.

The fan 56 may include a plurality of radial stages. For example, as depicted in FIGS. 1 and 2, the fan 56 may include an inner radial stage 56A and an outer radial stage 56B. The inner radial stage 56A of the fan 56 is configured to pass the exhaust gas stream 32 generated by the gas turbine system 12 into the mixing area 36 with no or a minimal pressure increase. The outer radial stage 56B of the fan 56, however, is configured to draw in ambient air (arrows 126) through the air intake section 116 to cool the exhaust gas stream 32 to a level suitable for use with the SCR catalyst 38. In embodiments, the exhaust gas stream 32 is cooled in the mixing area 36 by the ambient air drawn in by the outer radial stage 56B of the fan 56 from about 1100° F. to less than about 900° F. A moving high temperature seal 58 may be provided on the fan 56 (e.g., on the inner radial stage 56A of the fan 56) to prevent the hot exhaust gas stream 32 from leaking into and mixing with the ambient air in the air intake section 116.

A flow directing system 60 may be provided to direct the ambient air drawn in by the outer radial stage 56B of the fan 56 at an angle toward and into (arrows 62) the exhaust gas stream 32 to enhance mixing. Such a flow directing system 60 may include, for example, outlet guide vanes, stators, nozzles, or any other suitable system for selectively directing the flow of bypass air into the mixing area 36.

An illustrative flow directing system 60 is shown in FIG. 2. In this example, the flow directing system 60 includes a plurality of guide vanes 64. Each guide vane 64 may be selectively controlled (e.g., rotated) by an actuator 66. The actuators 66 are shown schematically in FIG. 2, but any known actuator may be utilized. For example, the actuators 66 may comprise an electro-mechanical motor, or any other type of suitable actuator. The actuators 66 may be independently and/or collectively controlled in response to commands from the airflow controller 100 to selectively vary the positioning of the guide vanes 64. That is, the guide vanes 64 may be selectively rotated about a pivot axis by the actuators 66. In embodiments, each guide vane 64 may be individually pivoted independently of any other guide vane 64. In other embodiments, groups of guide vanes 64 may be pivoted independently of other groups of guide vanes 64 (i.e., pivoted in groups of two or more such that every guide vane 64 in a group rotates together the same amount). Position information (e.g., as sensed by electro-mechanical sensors or the like) for each of the guide vanes 64 may be provided to the airflow controller 100. The airflow controller 100 may adjust the rotational angle of one or more of the guide vanes 64 to vary the directional flow of the ambient air into the mixing area 36.

A supplemental mixing system 68 (FIG. 1) may be positioned within the mixing area 36 to enhance the mixing process. The supplemental mixing system 68 may comprise, for example, a static mixer, baffles, and/or the like.

As depicted in FIG. 2, an inlet guide vane assembly 70 including a plurality of inlet guide vanes 72 may be used to control the amount of ambient air available to the fan 56 via the air intake section 116. Each inlet guide vane 72 may be selectively controlled (e.g., rotated) by an independent actuator 74. The actuators 74 are shown schematically in FIG. 2, but any known actuator may be utilized. For example, the actuators 74 may comprise an electro-mechanical motor, or any other type of suitable actuator.

The actuators 74 may be independently and/or collectively controlled in response to commands from an airflow controller 100 to selectively vary the positioning of the inlet guide vanes 72. That is, the inlet guide vanes 72 may be selectively rotated about a pivot axis by the actuators 74. In embodiments, each inlet guide vane 72 may be individually pivoted independently of any other inlet guide vane 72. In other embodiments, groups of inlet guide vanes 72 may be pivoted independently of other groups of inlet guide vanes 72 (i.e., pivoted in groups of two or more such that every inlet guide vane 72 in a group rotates together the same amount). Position information (e.g., as sensed by electro-mechanical sensors or the like) for each of the inlet guide vanes 72 may be provided to the airflow controller 100.

The airflow controller 100 (FIG. 1) may be used to regulate the amount of ambient air drawn in by the outer radial stage 56B of the fan 56 through the air intake section 116 using the in order to maintain a suitable temperature at the SCR catalyst 38 under varying operating conditions. That is, the amount of ambient air drawn in by the outer radial stage 56B of the fan 56 and directed into the mixing area 36 may be varied (e.g., by adjusting the inlet guide vane assembly 70 under control of the airflow controller 100) as the temperature of the exhaust gas stream 32 changes, in order to regulate the temperature at the SCR catalyst 38.

The airflow controller 100 may receive data 102 associated with the operation of the gas turbine power generation system 10. Such data may include, for example, the temperature of the exhaust gas stream 32 as it enters the mixing area 36, the temperature of the exhaust gas stream 32 at the SCR catalyst 38 after mixing/cooling has occurred in the mixing area 36, the temperature of the air drawn into the air intake section 16 by the compressor component 18 of the gas turbine system 12, the temperature of the air drawn into the air intake section 116 by the outer radial stage 56 of the fan 56, and other temperature data obtained at various locations within the gas turbine power generation system 10. The data 102 may further include airflow and pressure data obtained, for example, within the air intake sections 16, 116, at the inlet guide vanes 72, at the fan 56, at the entrance of the compressor component 18, at the downstream end 30 of the turbine component 22, and at various other locations within the gas turbine power generation system 10. Load data, fuel consumption data, and other information associated with the operation of the gas turbine system 12 may also be provided to the airflow controller 100. The airflow controller 100 may further receive positional information associated with the guide vanes 64, inlet guide vanes 72, etc. It should be readily apparent to those skilled in the art how such data may be obtained (e.g., using appropriate sensors, feedback data, etc.), and further details regarding the obtaining of such data will not be provided herein.

Based on the received data 102, the airflow controller 100 is configured to vary as needed the amount of ambient air drawn into the mixing area 36 to maintain the temperature at the SCR catalyst 38 at a suitable level. This may be achieved, for example, by varying the flow of ambient air drawn into the mixing area 36 by the outer radial stage 56B of the fan 56 (this flow may be controlled, for example, by adjusting the position of one or more of the inlet guide vanes 72 and guide vanes 64, and/or by increasing the rotational speed of the expander shaft 124).

The airflow controller 100 may include a computer system having at least one processor that executes program code configured to control the flow of ambient air into the mixing area 36 using, for example, data 102 and/or instructions from human operators. The commands generated by the airflow controller 100 may be used to control the operation of various components (e.g., such as actuators 66, 74, and/or the like) in the gas turbine power generation system 10. For example, the commands generated by the airflow controller 100 may be used to control the operation of the actuators 66 and 74 to control the rotational position of the guide vanes 64 and inlet guide vanes 72, respectively. Commands generated by the airflow controller 100 may also be used to activate other control settings in the gas turbine power generation system 10.

Figure 3:
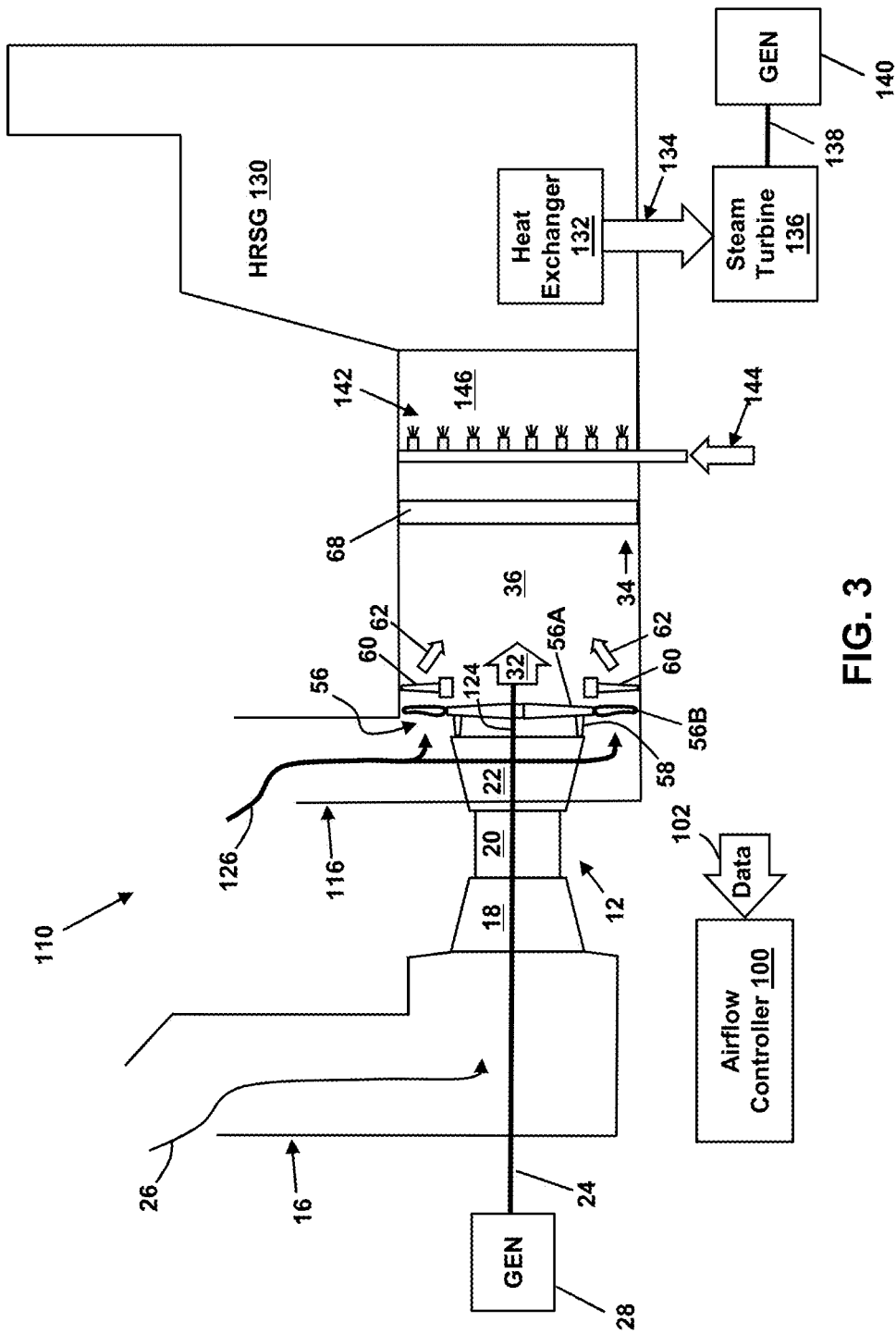
FIG. 3 shows a schematic diagram of a combined cycle (CC) power generation system according to embodiments.

A block diagram of an exemplary turbomachine system (e.g., combined cycle (CC) power generation system 110) is depicted in FIG. 3. According to embodiments, components similar to those enclosed within the rectangle 80 shown in FIG. 1 (see also FIG. 2) and described above may be used in the CC power generation system 110 to reduce the temperature of the exhaust gas stream 32 entering a heat recovery steam generator (HRSG system 130).

The HRSG system 130 generally comprises a heat exchanger 132 that recovers heat from the exhaust gas stream 32 of the gas turbine system 12 to produce steam 134. The steam 134 may be used to drive one or more steam turbine systems 136. Each steam turbine system 136 may be coupled via a shaft 138 to one or more electrical generators 140 for producing electricity. The combination of the gas turbine system 12 and the steam turbine system 136 generally produces electricity more efficiently than either the gas turbine system 12 or steam turbine system 136 alone. The steam 134 generated by the HRSG system 130 may also be used in other processes, such as district heating or other process heating. In embodiments, the HRSG system 130 may further include a duct burner system 142 that is configured to burn fuel 144 (e.g., natural gas) in a combustion chamber 146 in order to increase the quantity and/or temperature of the steam 134 generated in the HRSG system 130.

The airflow controller 100 (FIG. 3) may be used to regulate the amount of ambient air drawn in by the outer radial stage 56B of the fan 56 through the air intake section 116 in order to maintain a suitable temperature of the exhaust gas stream 32 at the HRSG system 130 under varying operating conditions. That is, the amount of ambient air drawn in by the outer radial stage 56B of the fan 56 and directed into the mixing area 36 may be varied (e.g., under control of the airflow controller 100) as the temperature of the exhaust gas stream 32 changes, in order to regulate the temperature at the HRSG system 130. In embodiments, the temperature of the exhaust gas stream 32 generated by the gas turbine system 12 is cooled from about 1100° F. to about 600° F.-1000° F. in the mixing area 36.

The airflow controller 100 may receive data 102 associated with the operation of the CC power generation system 110. Such data may include, for example, the temperature of the exhaust gas stream 32 as it enters the mixing area 36, the temperature of the exhaust gas stream 32 at the HRSG system 130 after mixing/cooling has occurred in the mixing area 36, the temperature of the air drawn into the air intake section 116 by the outer radial stage 56B of the fan 56, and other temperature data obtained at various locations within the CC power generation system 110. The data 102 may further include airflow and pressure data obtained, for example, within the air intake sections 16, 116, at the inlet guide vanes 70, at the fan 56, at the entrance of the compressor component 18, at the downstream end 30 of the turbine component 22, and at various other locations within the gas turbine power generation system 10. Load data, fuel consumption data, and other information associated with the operation of the gas turbine system 12 may also be provided to the airflow controller 100. The airflow controller 100 may further receive positional information associated with the guide vanes 64, inlet guide vanes 72, etc. It should be readily apparent to those skilled in the art how such data may be obtained (e.g., using appropriate sensors, feedback data, etc.), and further details regarding the obtaining of such data will not be provided herein.

Based on the received data 102, the airflow controller 100 is configured to vary as needed the amount of ambient air drawn into the mixing area 36 to maintain the temperature at the HRSG system 130 at a suitable level (e.g., from about 1100° F. to about 600° F.-1000° F.). This may be achieved, for example, by varying the flow of ambient air drawn into the mixing area 36 by the outer radial stage 56B of the fan 56 (this flow may be controlled, for example, by adjusting the position of one or more of the inlet guide vanes 72 and guide vanes 64, and/or by increasing the rotational speed of the expander shaft 124

The airflow controller 100 may include a computer system having at least one processor that executes program code configured to control the flow of ambient air into the mixing area 36 using, for example, data 102 and/or instructions from human operators. The commands generated by the airflow controller 100 may be used to control the operation of various components (e.g., such as actuators 66, 74, and/or the like) in the CC power generation system 110. For example, the commands generated by the airflow controller 100 may be used to control the operation of the actuators 66 and 74 to control the rotational position of the guide vanes 64 and inlet guide vanes 72, respectively. Commands generated by the airflow controller 100 may also be used to activate other control settings in the CC power generation system 110.

Figure 4:
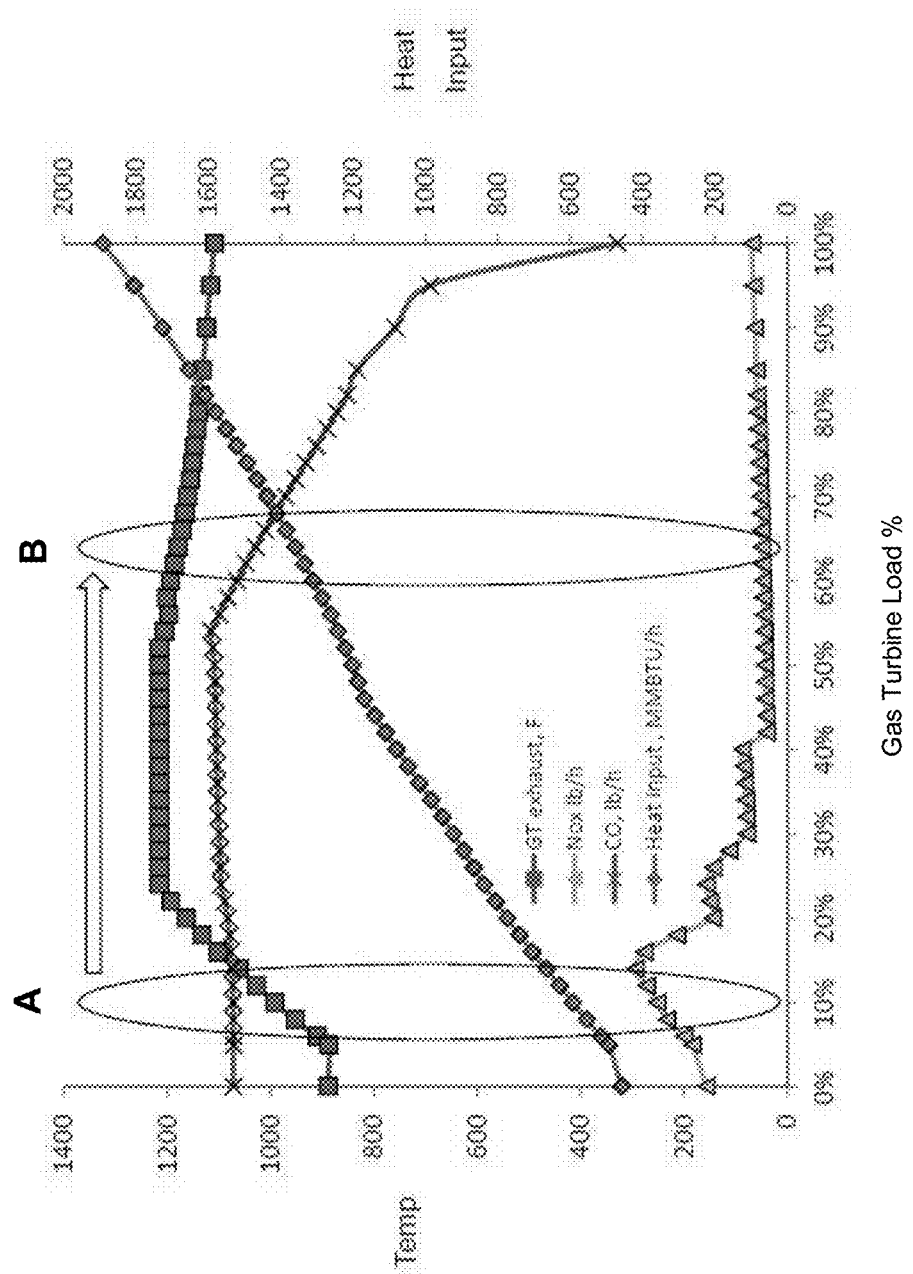
FIG. 4 is an illustrative chart depicting various operating conditions during a typical start-up process in a CC power generation system according to embodiments.

Examples of the start-up operation and the normal steady state operation of the CC power generation system 110 will now be provided with reference to FIGS. 3 and 4.

Start-Up Operation

During a start-up process in a conventional CC power generation system, the gas turbine needs to be parked at a lower load (e.g., compared to the minimum emissions compliance load (MECL)), which results in higher $NO_x$ and CO emissions. This is done, for example, to maintain the temperature of the steam entering the steam turbine to around 700° F. to avoid thermal stresses in the steam turbine. This lower load is indicated by point "A" in FIG. 4.

In contrast, according to embodiments, in a CC power generation system 110 including a rotating fan 56 for directing cooling ambient air into the exhaust gas stream 32 of a gas turbine system 12, the gas turbine system 12 can be parked at a higher load (as indicated by point "B" in FIG. 4) with a higher exhaust temperature. At the higher exhaust temperature, the $NO_x$ and CO emissions in the exhaust gas stream 32 are lower. The temperature of the exhaust gas stream 32 of the gas turbine system 12 can be controlled using the ambient air provided using the fan 56 to provide an inlet temperature of about 700° F. at the HRSG system 130. This results in lower start-up $NO_x$ and CO emissions and also helps to increase the power output of the gas turbine system 12 during start-up. Comparing point A and point B in FIG. 4, for example, it can easily be seen that the gas turbine system 12 can be operated (point B) at a higher temperature and higher load than a conventional gas turbine system (point A), while still providing an inlet temperature of about 700° F. at the HRSG system 130.

Normal Operation

During normal operation, the ambient air provided by the fan 56 and mixed into the exhaust gas stream 32 of the gas turbine system 12 increases the flow into the HRSG system 130 and reduces the temperature of the flow. This allows increased firing in the duct burner system 142 without reaching the tube temperature limit of the HRSG system 130 (e.g., around 1600° F.). This also allows increased power output from the bottoming cycle of the CC power generation system 110. In embodiments, the power output of the CC power generation system 110 can be increased, for example, by 10 to 15% compared to the power output of a conventional CC power generation system (i.e., no fan 56).

In embodiments, several parameters can be regulated to control the power output of the CC power generation system 110, including:
1) the rotational status of the fan 56;
2) the amount of ambient air provided to the mixing area 36 to cool the exhaust gas stream 32;
3) the amount of firing of the duct burner system 142 (e.g., to move temperature of the exhaust gas flow to a target level after the ambient air has been injected into the exhaust gas stream 32); and
4) the amount of overfiring or underfiring of the gas turbine system 12 (to provide as much energy as feasible in the topping cycle).

Many advantages may be provided by the disclosed CC power generation system 110. For example, high duct burner firing is possible without reaching the HRSG tube temperature limit, resulting in higher bottoming cycle power output. In addition, the gas turbine system 12 may be run during start-up at a higher load point. This results in lower emissions and an exhaust gas stream 32 having a temperature higher than that needed for the steam turbine system 136. Even further, quick adjustments can be made (e.g., using inlet guide vanes 72 and/or guide vanes 64) to compensate for changes in the ambient air temperature.

The use of an airflow generation system including a fan 56 in lieu of conventional large external blower systems and/or other conventional cooling structures provides many advantages. For example, the need for redundant external blower systems and associated components (e.g., blowers, motors and associated air intake structures, filters, ducts, etc.) is eliminated. This reduces manufacturing and operating costs, as well as the overall footprint, of the gas turbine power generation system 10 and the CC power generation system 110.

Use of the fan 56 provides a more reliable and efficient gas turbine power generation system 10 and the CC power generation system 110. For example, since the ambient air used for cooling in the mixing area 36 is driven by the expander shaft 124 of the gas turbine system 12, large external blower systems are no longer required.

Power requirements of the gas turbine power generation system 10 and the CC power generation system 110 are reduced because the fan 56 is coupled to, and driven by, the expander shaft 124 of the gas turbine system 12. This configuration eliminates the need for large blower motors commonly used in conventional external blower cooling systems.

Figure 5:
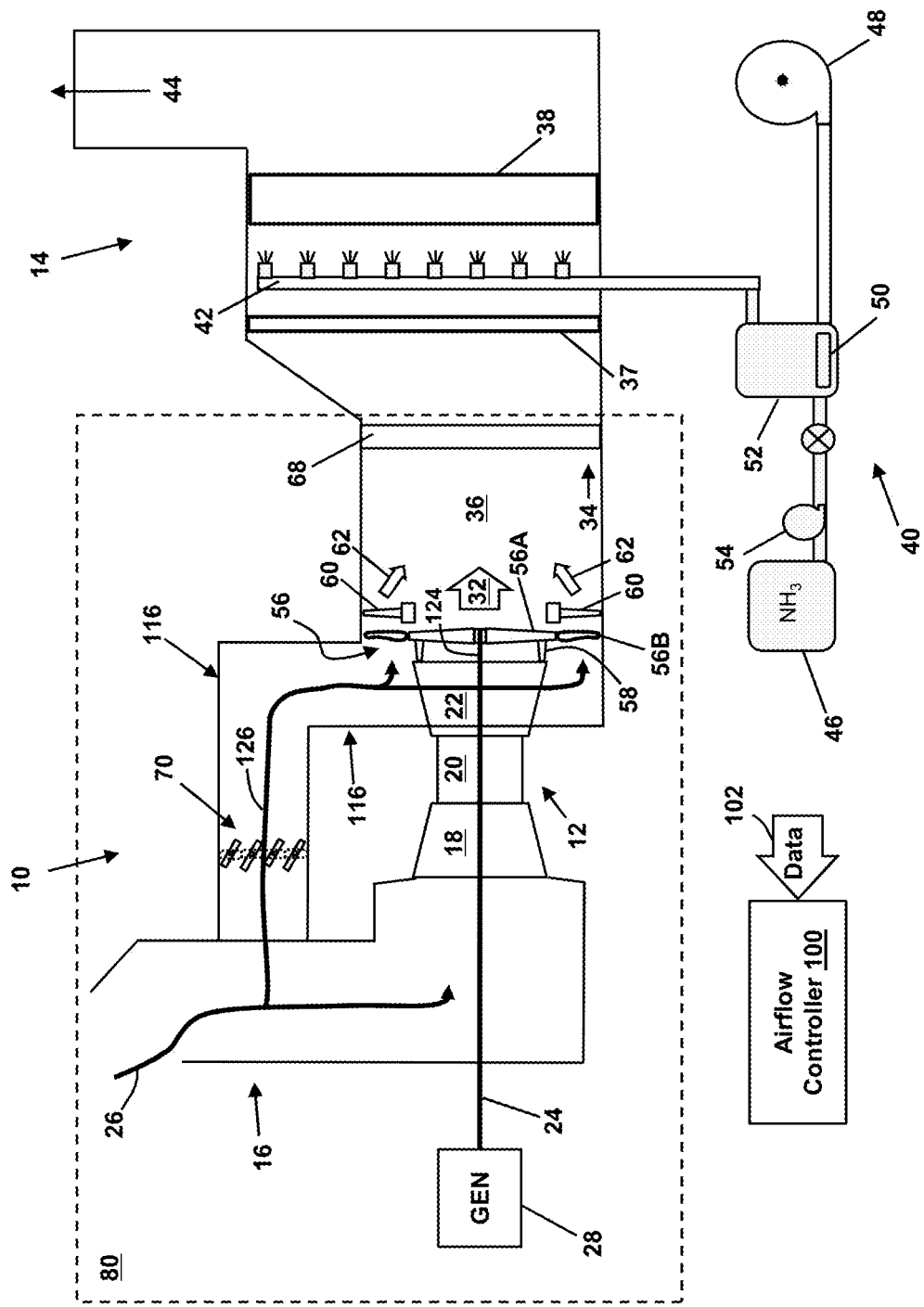
FIG. 5 is a schematic diagram of a simple cycle gas turbine power generation system according to another embodiment.

FIG. 5 is a schematic diagram of the simple cycle gas turbine power generation system 10 according to another embodiment. In this embodiment, the air intake section 116 is fluidly coupled to the air intake section 16. The inlet guide vane assembly 70 may be used to control the amount of cooling air (e.g., ambient air) drawn in through the air intake section 116 by the fan 56.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airflow control system for a gas turbine system, comprising:
    an airflow generation system for attachment to a rotatable expander shaft of a gas turbine system, downstream of the gas turbine system, for drawing in a flow of ambient air through an air intake section;
    a mixing area for receiving an exhaust gas stream produced by the gas turbine system; and
    a flow directing system for directing the flow of ambient air drawn in by the airflow generation system to the mixing area to reduce a temperature of the exhaust gas stream; wherein the airflow generation system comprises a fan which comprises an inner radial stage for passing the exhaust gas stream produced by the gas turbine system to the mixing area; and an outer radial stage for drawing in the flow of ambient air through the air intake section; and a moving seal on the fan for preventing the exhaust gas stream from entering the air intake section.

2. The airflow control system of claim 1, further comprising an inlet guide vane system for controlling the flow of air through the air intake section to the outer radial stage of the fan.

3. The airflow control system of claim 1, wherein the flow directing system is configured to direct the ambient air drawn in by the outer radial stage of the fan at an angle toward and into the exhaust gas stream.

4. The airflow control system of claim 3, wherein the flow directing system comprises a guide vane system.

5. The airflow control system of claim 1, further comprising a selective catalytic reduction (SCR) system for processing the reduced temperature exhaust gas stream.

6. The airflow control system of claim 1, further comprising a heat recovery steam generator (HRSG) system for processing the reduced temperature exhaust gas stream.

7. The airflow control system of claim 1, wherein the air intake section is coupled to an air intake section of the gas turbine system.

8. A turbomachine system, comprising:
    a gas turbine system including a compressor component, a combustor component, and a turbine component;
    a fan coupled to an expander shaft of the gas turbine system, downstream of the gas turbine system, for drawing in a flow of ambient air through an air intake section, wherein the fan comprises an inner radial stage for passing the exhaust gas stream produced by the gas turbine system to the mixing area, and an outer radial stage for drawing in the flow of ambient air through the air intake section; and a moving seal on the fan for preventing the exhaust gas stream from entering the air intake section;
    a mixing area for receiving an exhaust gas stream produced by the gas turbine system; and
    a flow directing system for directing the flow of ambient air drawn in by the airflow generation system to the mixing area to reduce a temperature of the exhaust gas stream.

9. The turbomachine system of claim 8, further comprising an inlet guide vane system for controlling the flow of air through the air intake section to the outer radial stage of the fan.

10. The turbomachine system of claim 8, wherein the flow directing system is configured to direct the ambient air drawn in by the outer radial stage of the fan at an angle toward and into the exhaust gas stream.

11. The turbomachine system of claim 10, wherein the flow directing system comprises a guide vane system.

12. The turbomachine system of claim 8, further comprising a selective catalytic reduction (SCR) system for processing the reduced temperature exhaust gas stream.

13. The turbomachine system of claim 8, further comprising a heat recovery steam generator (HRSG) system for processing the reduced temperature exhaust gas stream.

14. A power generation system, comprising:
    a gas turbine system including a compressor component, a combustor component, and a turbine component;
    a shaft driven by the turbine component;
    an electrical generator coupled to the shaft for generating electricity;
    a fan coupled to an expander shaft of the gas turbine system, downstream of the gas turbine system, for drawing in a flow of ambient air through an air intake section, wherein the fan comprises an inner radial stage for passing the exhaust gas stream produced by the gas turbine system to the mixing area, and an outer radial stage for drawing in the flow of ambient air through the air intake section; and a moving seal on the fan for preventing the exhaust gas stream from entering the air intake section;
    a mixing area for receiving an exhaust gas stream produced by the gas turbine system; and
    a flow directing system for directing the flow of ambient air drawn in by the airflow generation system to the mixing area to reduce a temperature of the exhaust gas stream.

15. The power generation system of claim 14, further comprising:
    a selective catalytic reduction (SCR) system for processing the reduced temperature exhaust gas stream; or
    a heat recovery steam generator (HRSG) system for processing the reduced temperature exhaust gas stream.

* * * * *